3,047,634
PRODUCTION OF ISOZEAXANTHIN
DIALKYL ETHERS
Otto Isler, Basel, Rudolf Rüegg, Bottmingen, and Gabriel Saucy, Riehen, Switzerland, assignors to Hoffmann-La Roche, Inc., Nutley, N.J., a corporation of New Jersey
No Drawing. Filed Nov. 3, 1958, Ser. No. 771,238
Claims priority, application Switzerland Nov. 8, 1957
6 Claims. (Cl. 260—611)

This invention relates to isozeaxanthin dialkyl ethers and to a method for the production thereof. More particularly, the invention relates to the production of 15,15'-dehydro-isozeaxanthin di-lower alkyl ethers, 15,15'-cis-isozeaxanthin di-lower alkyl ethers and all-trans isozeaxanthin di-lower alkyl ethers.

According to this invention, 1,18-di-(2,6,6-trimethyl-2-cyclohexen - 1 - ylidene) - 3,7,12,16 - tetramethyl - 2,4,6,12,14,16-octadecahexaen-9-yn-8,11-diol is reacted with a lower aliphatic alcohol in the presence of a strong acid to produce 15,15'-dehydroisozeaxanthin di-lower alkyl ether. The central triple bond may be selectively hydrogenated to a double bond in the presence of a selective hydrogenation catalyst. There is obtained as a result of the hydrogenation, 15,15'-cis-isozeaxanthin di-lower alkyl ether. If desired, the cis compound may be isomerized to the all-trans compound, for example by heating.

Alcohols which react with 1,18-di-(2,6,6-trimethyl-2-cyclohexen - 1 - ylidene) - 3,7,12,16 - tetramethyl - 2,4,6,12,14,16-octadecahexaen-9,yn-8,11-diol include lower aliphatic alcohols such as methanol, ethanol, isopropanol, etc. The alcohol functions simultaneously as a reactant and as a solvent. Therefore, it is preferable to use an excess of the alcohol, i.e. more than two molar proportions of lower aliphatic alcohol for each molar proportion of diol.

Strong acids, which are present during the reaction of the diol with the lower aliphatic alcohol, include organic and inorganic acids, for example arylsulfonic acids such as p-toluenesulfonic acid or mineral acids such as sulfuric acid. The acid is present in minor, catalytic amount.

When the procedure described above is carried out, the 15,15'-dehydro-isozeaxanthin di-lower alkyl ether crystallizes directly from the reaction medium.

The 15,15'-dehydro-isozeaxanthin di-lower alkyl ethers may, if desired, be partially hydrogenated on the triple bond in the presence of a selective catalyst, for example lead-paralladium catalyst in the presence of quinoline [Helv. Chim. Acta 35, 446 (1952)]. Preferably the reduction is effected with hydrogen in an inert solvent, for example an inert organic solvent such as ethyl acetate.

By means of the hydrogenation reaction, 15,15'-cis-isozeaxanthin di-lower alkyl ether is obtained. This may be converted, if desired, to the all-trans compound by isomerization, for example, by heating in an inert solvent, e.g. an inert hydrocarbon solvent such as petroleum ether.

The compounds obtained according to this invention are useful as coloring agents for feeds, producing a yellow-to-orange color. They may also be incorporated in poultry feeds to heighten the color of egg yolk, skin, meat and fatty tissue.

The following examples are illustrative of the invention. All temperatures are stated in degrees centigrade.

*Example 1*

50 g. of 1,18-di-(2,6,6-trimethyl-2-cyclohexen-1-ylidene) - 3,7,12,16 - tetramethyl - 2,4,6,12,14,16 - octadecahexaen-9-yn-8,11-diol were dissolved in 200 ml. of methanol. To this solution was added a solution of 0.5 g. p-toluenesulfonic acid in 100 ml. of methanol. The solution was permitted to stand at room temperature for 12 hours whereupon a voluminous, orange-colored precipitate formed. 5 ml. of a saturated solution of sodium carbonate were added and then the precipitate was filtered off. The product was purified by recrystallization from petroleum ether. The 15,15'-dehydro-isozeaxanthin dimethyl ether melts at 138–141° and shows three maxima in the ultraviolet absorption spectrum (in petroleum ether) at 278, 429 and 454 m$\mu$;

$$E_1^1 = 400, 1805 \text{ and } 1450, \text{ respectively}$$

The procedure described above was repeated in precisely the same manner substituting ethanol for the methanol to obtain 15,15' - dehydro - isozeaxanthin diethyl ether, M.P. 109–110°, and then repeated again substituting isopropanol for methanol to obtain 15,15'-dehydro-isozeaxanthin diisopropyl ether, M.P. 108–109°.

*Example 2*

10 g. of 15,15'-dehydro-isozeaxanthin dimethyl ether were dissolved in 200 ml. of ethyl acetate. 2 g. of lead-palladium catalyst [Helv. Chim. Acta 35, 446 (1952)] and 0.1 ml. of quinoline were added. The mixture was hydrogenated under normal conditions until one molar proportion of hydrogen was absorbed. The 15,15'-cis-isozeaxanthin dimethyl ether was separated from the catalyst by filtration, concentrated and crystallized from petroleum ether. The compound metals at 105–107° and shows three maxima in the ultraviolet absorption spectrum at 337 m$\mu$ (cis-peak), 449 m$\mu$ and 475 m$\mu$.

10 g. of crude 15,15'-cis-isozeaxanthin dimethyl ether obtained according to the procedure described above, after separation of the catalyst, was concentrated and dissolved in 50 ml. of petroleum ether (boiling range 80–110°) and refluxed for two hours. Upon cooling, all-trans isozeaxanthin dimethyl ether precipitated, M.P. 160°; U.V. absorption maxima at 450 and 478 m$\mu$.

15,15'-dehydro-isozeaxanthin diethyl ether and 15,15'-dehydro-isozeaxanthin diisopropyl ether were hydrogenated according to the same procedure described above to obtain, respectively, 15,15'-cis-isozeaxanthin diethyl ether and 15,15'-cis-isozeaxanthin diisopropyl ethyl ether. These compounds were isomerized according to the same procedure described above to obtain, respectively, all-trans isozeaxanthin diethyl ether and all-trans isozeaxanthin diisopropyl ether, each compound showing U.V. absorption maxima at 450 and 478 m$\mu$.

We claim:
1. 15,15'-dehydro-isozeaxanthin di-lower alkyl ether.
2. 15,15'-dehydro-isozeaxanthin dimethyl ether.
3. 15,15'-dehydro-isozeaxanthin diethyl ether.
4. 15,15'-dehydro-isozeaxanthin diisopropyl ether.
5. A process which comprises reacting 1,18-di-(2,6,6-trimethyl - 2 - cyclohexen - 1 - ylidene) - 3,7,12,16 - tetramethyl - 2,4,6,12,14,16 - octadecahexaen - 9 - yn - 8,11-diol at about room temperature with an excess of a lower aliphatic alcohol in the presence of a strong acid to produce 15,15'-dehydro-isozeaxanthin di-lower alkyl ether, selectively catalytically hydrogenating the triple bond of the last named compound to a double bond and isomerizing the thus obtained isozeaxanthin di-lower alkyl ether having cis configuration to all-trans configuration by heating.

6. A method for the production of 15,15'-dehydro-isozeaxanthin di-lower alkyl ether which comprises reacting 1,18-di-(2,6,6-trimethyl-2-cyclohexen-1-ylidene)-3,7,12,16 - tetramethyl - 2,4,6,12,14,16 - octadecahexaen-9-yn-8,11-diol at about room temperature with an excess of a lower aliphatic alcohol in the presence of a strong acid.

References Cited in the file of this patent

Fieser et al.: Organic Chemistry, 3rd ed. (1956), p. 135. (Copy in Library.)